No. 752,674. PATENTED FEB. 23, 1904.
H. J. HAYS.
PROCESS OF WORKING GLASS.
APPLICATION FILED APR. 23, 1903.
NO MODEL.
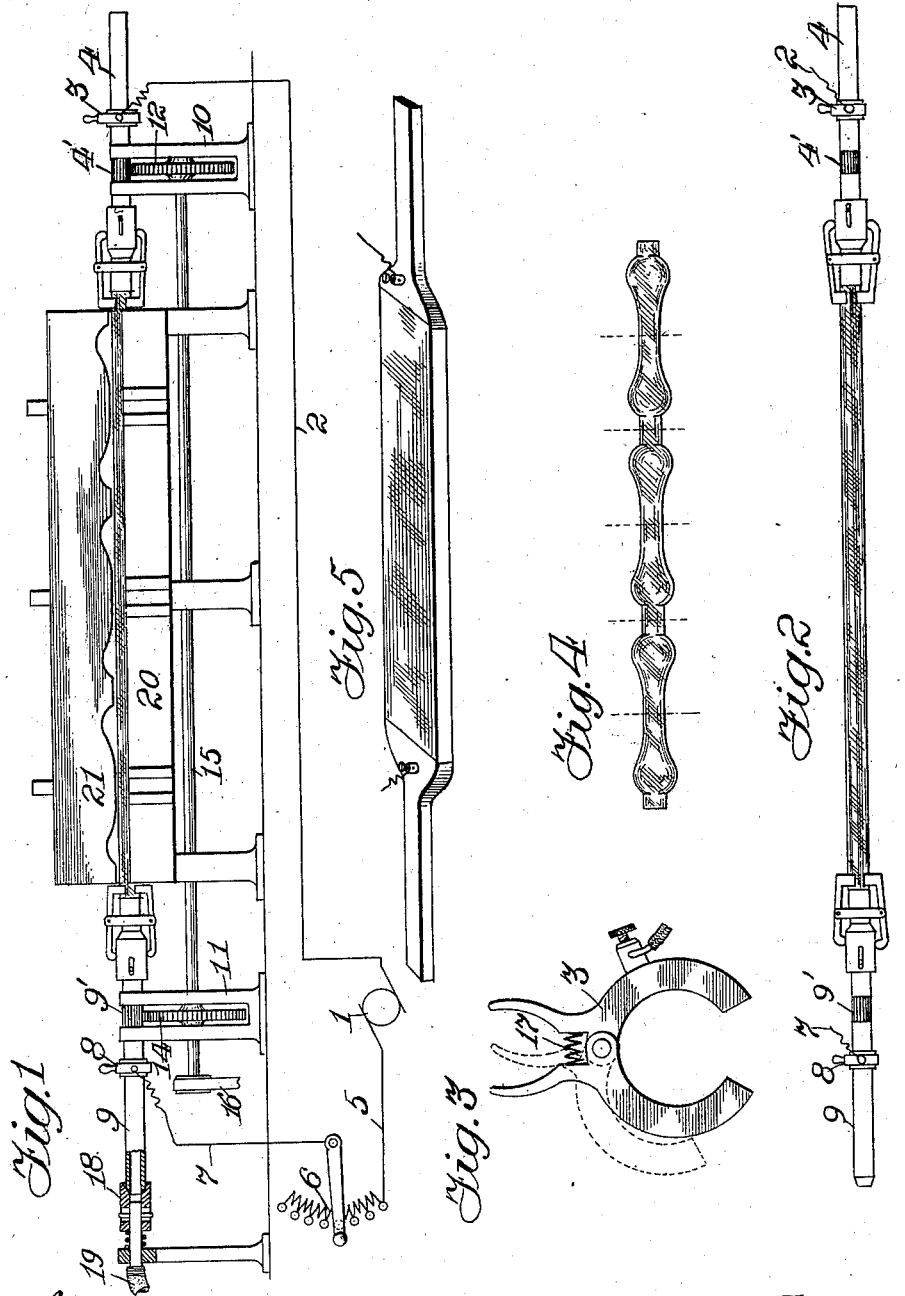
Witnesses:
Geo. B. Rowley.
E. E. Potter.
Inventor,
H. J. Hays.
By H. C. Evirth
Attorneys.

No. 752,674. Patented February 23, 1904.

UNITED STATES PATENT OFFICE.

HARRY JACOB HAYS, OF PITTSBURG, PENNSYLVANIA, ASSIGNOR TO EDWARD F. HAYS, TRUSTEE, OF PITTSBURG, PENNSYLVANIA.

PROCESS OF WORKING GLASS.

SPECIFICATION forming part of Letters Patent No. 752,674, dated February 23, 1904.

Application filed April 23, 1903. Serial No. 153,963. (No specimens.)

*To all whom it may concern:*

Be it known that I, HARRY JACOB HAYS, a citizen of the United States of America, residing at Pittsburg, in the county of Allegheny and State of Pennsylvania, have invented certain new and useful Improvements in Processes of Working Glass, of which the following is a specification, reference being had therein to the accompanying drawings.

This invention relates to certain new and useful improvements in a process for working glass, and relates more particularly to maintaining heat within the piece of glass to be worked in order that the same may be in a pliable condition for a greater length of time, thereby permitting a more perfect manipulation of the same.

The object of this invention is to provide means of maintaining heat in the piece of glass during its manipulation, said means comprising the passage of an electrical current through said piece of glass and a variable resistance interposed in said circuit for controlling the strength of the current to be passed through the glass.

A further object of this invention is to accomplish the above results in a simple and expeditious manner.

In the accompanying drawings, Figure 1 is an elevation, partly in section, showing my improved process as applied to a tubular piece of glass which is to be formed into a plurality of chimneys or similarly-shaped articles within the split mold. Fig. 2 is a view of a piece of glass being held in the usual clips, the electrical connection for the same being indicated. Fig. 3 shows the clamps for forming the electrical connection between the conductor and the clips in which the glass is held. Fig. 4 shows the product of a piece of glass which has been worked in the device illustrated in Fig. 1. Fig. 5 illustrates a piece of glass to which are fused holding-clips and the electrical connections of the same, whereby the current is conducted to the piece of glass which is to be maintained at any certain heat during its manipulation.

In carrying out my invention I provide a suitable dynamo 1, the one conductor 2 of which leads to the clip 3, which is mounted on the pipe of the holding-snap 4, which latter is suitably connected with the piece of glass to be worked. The other conductor 5 of the dynamo leads to the variable resistance or rheostat 6 and is then conducted by the wire 7 to the clip 8, which is mounted on the pipe of the snap 9, which latter is secured to the other end of the piece of glass to be worked. These snaps 4 and 9 are provided intermediate their length with suitable pinions 9' and 4', which when said snaps are placed in brackets 10 11 are engaged by the gear-wheels 12 14, said gear-wheels being secured to the shaft 15, which is rotated by the belt 16 or other suitable connection. The brackets 10 11 are formed with insulated bearings which support the pipes of the clips 4 and 9, and pinions 4' 9' are insulated from the pipes of the snaps, or else gears 12 14 are insulated from the drive-shaft, so that short-circuiting is prevented. The clips 3 and 8 are held in contact with the pipes of the snaps by the springs 17; but said springs are of such strength that rotation of the snaps within the clips is permitted, the wires connected to the clips holding them against rotation. The snap 9 has its outer end formed in a conical shape, said end being engaged by the spring-block 18, an aperture being formed in said block and a suitable air or fluid supply being connected therewith for the purpose of supplying air or fluid pressure to the inside of the piece of glass to be worked, enabling the blowing of the same. A split mold, which is formed in two parts 20 21, suitably hinged together, is supported on feet, said mold being placed between the brackets 10 11.

The operation of the process is as follows: The heated glass being secured between the snaps 4 and 9, the spring-clips 3 and 8 are mounted on said snaps and an electrical current of suitable strength is caused to pass through the same, thereby maintaining the glass at a desired heat. The operator then grasps the two snaps and by suitably operating the same elongates the piece of glass to the desired length, after which the snaps are laid in brackets 10 11, and pinions 4' 9' are then in engagement with gear-wheels 12 and 14. The upper portion of the mold is then closed down and the rotation of the shaft 15 is commenced, thereby imparting a rotary movement to the snaps and the piece of glass being worked and shaped. The spring-pressed block 18 being placed over the end of the pipe of snap 9, the air or fluid pressure is then suitably regulated whereby to conduct a suitable amount thereof to the interior of the piece of glass being worked and shaped, said air or fluid supply forcing the glass against the interior form of the mold, whereby the glass will be forced to the predetermined shape. The mold, as shown in Fig. 1, will produce an article as shown in Fig. 4, which in this case is a plurality of lamp-chimneys, and by cutting the same as indicated by dotted lines in Fig. 4 six lamp-chimneys will result from the operation.

Processes as heretofore practiced for the forming of a series of lamp-chimneys or like articles at one time in a mold have been impracticable, for the reason that the glass within the mold becomes chilled before the glass could be properly forced into the required form; but by my improved process a constant heat being maintained in the glass it permits of the operation being successfully performed as described.

While the process is described in connection with blowing chimneys or similar articles in the mold, it is obvious that the same is applicable to any manipulation of the glass wherein it is desired to maintain a heat in the same for a greater length of time than has heretofore been possible.

As shown in Fig. 5, two clamps are fused to the end of the piece of glass and electrical connections made with each clamp whereby the current is caused to pass through said piece of glass, thereby maintaining a desired heat within the same, permitting the fluting, rolling, or working of the glass in any desired manner.

Having fully described my invention, what I claim as new, and desire to secure by Letters Patent, is—

1. The herein-described process for working glass which consists in maintaining an electrical current through the glass, working the glass to suitable dimensions while in the heated state, and finally shaping the glass into predetermined form, substantially as described.

2. The herein-described process for working glass which consists in maintaining a variable electrical current through the glass, working the glass to suitable dimensions while in the heated state, and finally shaping the glass into predetermined form, substantially as described.

In testimony whereof I affix my signature in the presence of two witnesses.

HARRY JACOB HAYS.

Witnesses:
A. M. WILSON,
E. E. POTTER.